(12) United States Patent
Cox, III

(10) Patent No.: US 7,809,216 B2
(45) Date of Patent: Oct. 5, 2010

(54) BI-DIRECTIONAL SIGNAL INTERFACE AND APPARATUS USING SAME

(75) Inventor: Charles H. Cox, III, Carlisle, MA (US)

(73) Assignee: Photonic Systems, Inc., Billerica, MA (US)

(*) Notice: Subject to any disclaimer, the term of this patent is extended or adjusted under 35 U.S.C. 154(b) by 596 days.

(21) Appl. No.: 11/687,046

(22) Filed: Mar. 16, 2007

(65) Prior Publication Data

US 2008/0227410 A1    Sep. 18, 2008

(51) Int. Cl.
- G02F 1/035 (2006.01)
- H04B 10/00 (2006.01)
- H04B 1/44 (2006.01)

(52) U.S. Cl. .............. 385/2; 385/1; 385/14; 385/8; 385/9; 398/135; 398/138; 398/139; 398/214; 455/82

(58) Field of Classification Search ............ 385/1, 385/2, 3, 14, 129, 130, 131, 24, 8, 9; 398/135, 398/138, 139, 187, 188, 189, 214, 116, 201, 398/115, 117, 118; 455/82
See application file for complete search history.

(56) References Cited

U.S. PATENT DOCUMENTS

| | | | |
|---|---|---|---|
| 2,973,512 A | 2/1961 | Walsh | |
| 4,719,412 A | 1/1988 | d'Humieres et al. | 324/77 K |
| 5,074,631 A * | 12/1991 | Hamano et al. | 385/3 |
| 5,287,212 A | 2/1994 | Cox et al. | |
| 5,303,079 A | 4/1994 | Gnauck et al. | |
| 5,369,381 A | 11/1994 | Gamand | |
| 5,389,782 A | 2/1995 | Hilliard | 250/227.17 |
| 5,602,387 A | 2/1997 | Bowen | |
| 5,977,911 A | 11/1999 | Green et al. | |
| 6,028,695 A | 2/2000 | Uemura et al. | 359/279 |
| 6,081,232 A | 6/2000 | Pittman et al. | |
| 6,137,442 A | 10/2000 | Roman et al. | |
| 6,175,672 B1 | 1/2001 | Newberg et al. | |
| 6,295,395 B1 | 9/2001 | Paek | |
| 6,310,706 B1 | 10/2001 | Heidemann et al. | |

(Continued)

FOREIGN PATENT DOCUMENTS

EP    0282293 A2    9/1998

(Continued)

OTHER PUBLICATIONS

"Notification of Transmittal of The International Search Report and The Written Opinion of The International Searching Authority, or The Declaration" For PCT/US2009/041058, Nov. 30, 2009, 11 Pages, International Searching Authority/Korean Intellectual Property Office, Daejeon, Republic of Korea.

(Continued)

Primary Examiner—Brian M Healy
(74) Attorney, Agent, or Firm—Kurt Rauschenbach; Rauschenbach Patent Law Group, LLP

(57) ABSTRACT

A signal interface includes a dual-drive device having a first and a second input port that receive an outgoing signal. One of the first and the second input ports also receive an incoming signal. The dual-drive device passes the incoming signal to an output port while isolating the outgoing signal from the incoming signal.

18 Claims, 12 Drawing Sheets

U.S. PATENT DOCUMENTS

| | | | |
|---|---|---|---|
| 6,320,539 | B1 | 11/2001 | Matthews et al. |
| 6,330,098 | B1 | 12/2001 | Gopalakrishnan |
| 6,337,660 | B1 | 1/2002 | Esman et al. |
| 6,393,177 | B2 | 5/2002 | Paek |
| 6,791,733 | B2 * | 9/2004 | Kawanishi et al. ......... 359/245 |
| 7,460,662 | B2 * | 12/2008 | Pagnanelli ................. 379/402 |
| 7,555,219 | B2 * | 6/2009 | Cox et al. .................. 398/139 |
| 7,561,803 | B2 * | 7/2009 | Burns et al. ................ 398/139 |
| 2002/0012500 | A1 | 1/2002 | Paek |
| 2002/0106141 | A1 | 8/2002 | Gopalakrishnan .............. 385/2 |
| 2003/0147581 | A1 | 8/2003 | Doi et al. .................... 385/14 |
| 2006/0133598 | A1 * | 6/2006 | Pagnanelli ............ 379/406.08 |
| 2007/0189778 | A1 | 8/2007 | Burns et al. ................ 398/183 |
| 2008/0227410 | A1 * | 9/2008 | Cox ........................... 455/82 |

FOREIGN PATENT DOCUMENTS

| | | |
|---|---|---|
| FR | 2796766 A1 | 1/2001 |
| JP | 57197934 | 12/1982 |
| JP | 09008737 | 1/1997 |
| WO | 2005008832 A2 | 1/2005 |

OTHER PUBLICATIONS

"Notification of Transmittal of The International Search Report and The Written Opinion of The International Searching Authority, or The Declaration" For PCT/US08/003297, Jul. 4, 2008, 11 pages, the International Searching Authority/EPO, Rijswijk, The Netherlands.

"Office Action" for U.S. Appl. No. 10/710,463, Apr. 9, 2008, 7 pages, The USPTO, US.

"Office Action" for U.S. Appl. No. 11/353,701, Jul. 25, 2008, 6 pages, The USPTO, US.

"Notification Concerning Transmittal of International Preliminary Report on Patentability (Chapter I of The Patent Cooperation Treaty" For PCT/US2008/003297, Oct. 1, 2009, 8 pages, The International Bureau of WIPO, Geneva, Switzerland.

Ackerman, et al., the Effect Of A Mach-Zehnder Modulator's Travelling Wave Electrode Loss On A Photonic Link's Noise Figure, Proc. IEEE International Topical Meeting On Microwave Photonics, Sep. 2003, Budapest, Hungary.

Anderson, Is A Broadband Low Noise Photonic Link An Oxymoron? Proc. Photonic Systems For Antenna Applications Conference, 2000, Monterey, California.

Wenzel, Low Frequency Circulator/Isolator Uses No Ferrite Or Magnet, RF Design Magazine, 1991.

* cited by examiner

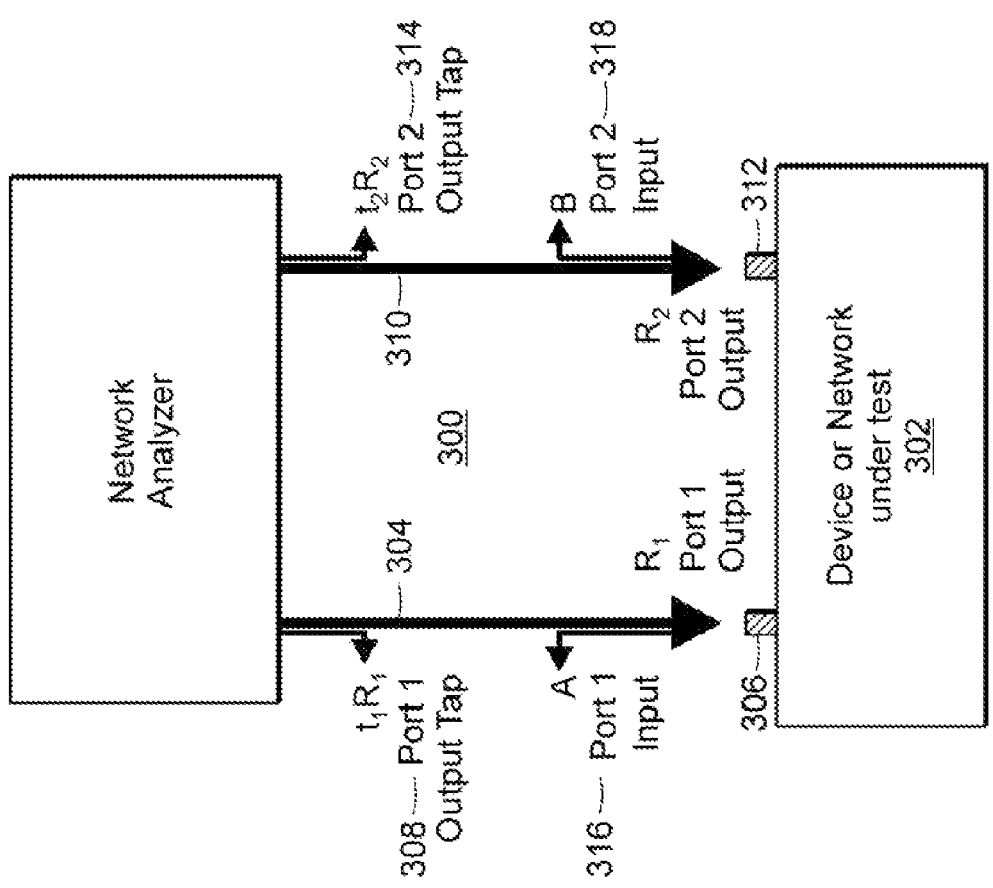

| Parameter | Krytar RF Directional Coupler | Photonic Bi-directional Interface | |
|---|---|---|---|
| | | Present | Future |
| Bandwidth (GHz) | 0.5 – 26.5 | 0.1 – 12 | 0.1 – 50 |
| Outgoing-to-incoming isolation (dB) | >26 | 50 | 75 |
| Outgoing signal gain (dB) | -1.5 | -7 | -5 |
| Incoming signal gain (dB) | -13 | -14 | +18 |
| Directivity (dB) | >13 | 36 | 93 |
| Signal-to-noise dynamic range for -10 dBm outgoing signal level (dB) | 100 | 160 | 160 |
| Noise figure for incoming signal | >13 | 25 | 6 |

FIG. 5

BI-DIRECTIONAL SIGNAL INTERFACE AND APPARATUS USING SAME

RELATED APPLICATION SECTION

This application is related to U.S. patent application Ser. No. 10/710,463, filed Jul. 13, 2004, now U.S. Pat. No 7,555,219, and entitled "Bi-Directional Signal Interface" and is related to U.S. patent application Ser. No. 11/353,701, now U.S. Pat. No 7,561,803, filed Feb. 14, 2006, and entitled "Bi-Directional Signal Interface Using Photonic Coupler." The entire contents of U.S. patent application Ser. Nos. 10/710,463 and 11/353,701 are incorporated herein by reference.

The section headings used herein are for organizational purposes only and should not be construed as limiting the subject matter described in the present application.

BACKGROUND OF THE INVENTION

This invention relates generally to signal interfaces, such as antenna signal interfaces, that can perform both transmit and receive functions. An antenna is a conductive structure that carries an electrical current when energized. Antennas are used to transmit and receive electromagnetic waves. When a time varying electrical current is electrically coupled to an antenna, the antenna will radiate an electromagnetic wave. When a time-varying electromagnetic field is received by an antenna, the antenna will generate a time varying electrical current.

Signal interfaces are used to efficiently transfer power. For example, an antenna signal interface is used to efficiently transfer power between an antenna and transmit and/or receive electronics. A transmit antenna interface is designed to transfer power efficiently from a transmission line that electrically couples a transmitter to the antenna. A receiver antenna interface is designed to transfer power efficiently from the antenna to a transmission line that is electrically coupled to a receiver.

A transceiver antenna interface is a bi-directional interface that is designed to transfer power efficiently from a transmission line that is electrically coupled to a transmitter to the antenna and also is designed to transfer power efficiently from the antenna to a transmission line that is electrically coupled to a receiver while minimizing the coupling of power between the transmit transmission line and the receive transmission line.

BRIEF DESCRIPTION OF THE DRAWINGS

The invention, in accordance with preferred and exemplary embodiments, together with further advantages thereof, is more particularly described in the following detailed description, taken in conjunction with the accompanying drawings. The drawings are not necessarily to scale, emphasis instead generally being placed upon illustrating principles of the invention.

FIG. 3A illustrates signal diagrams of RF signal paths in an S-parameter network analyzer that analyzes a two port network under test.

FIG. 3B illustrates the mathematical equations for the S parameters using the signal labels in the signal diagrams shown in FIG. 3A.

FIG. 5 is a table that presents data which compares RF performance of conventional directional couples used in commercially available network analyzers to RF performance of the bi-directional interface of the present invention.

DETAILED DESCRIPTION

Figure 1A:
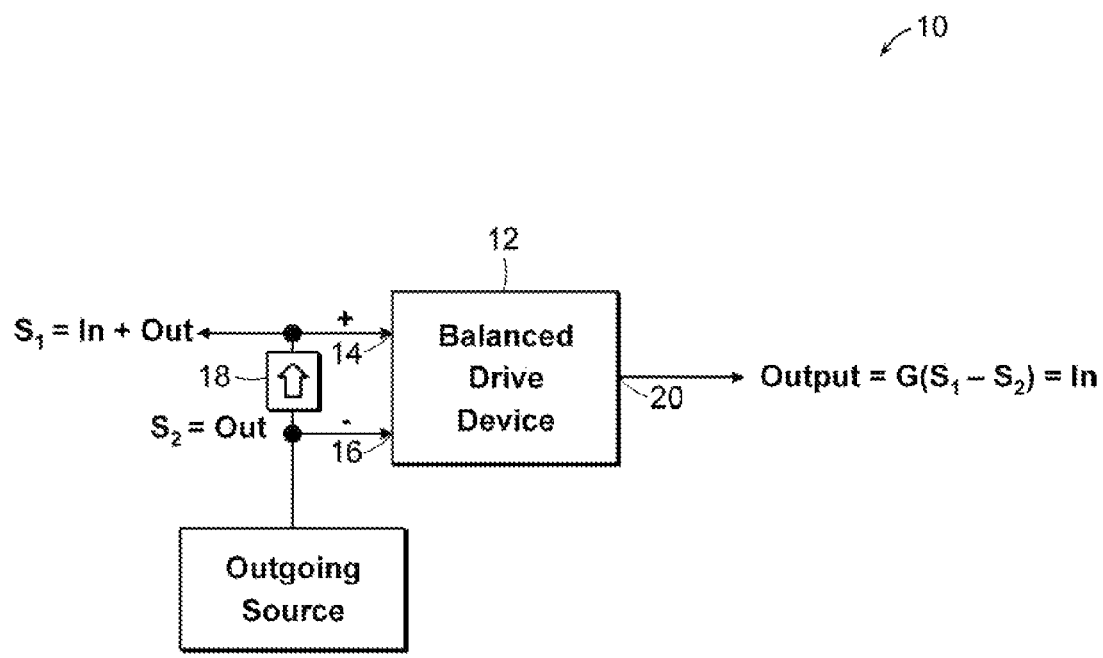
FIG. 1A illustrates a block diagram of a bi-directional signal interface according to the present invention that includes a general balanced drive device.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

Bi-directional signal interfaces can be characterized by their interface bandwidth, their incoming signal path noise figure, and by the isolation between the outgoing and incoming signal paths. Specific applications have very different signal interface requirements. For example, in radar applications, the bandwidth requirement is typically less than 10% of the radar carrier frequency, but the radar carrier frequency can be at frequencies as low as 10 MHz. Radar applications typically have the lowest noise figure requirements because of the path loss to and from the target (the so-called $r^4$ problem).

In digital data communication applications, the bandwidth typically extends from low frequency, or even DC, up to the maximum bit rate. Digital communications applications can tolerate higher noise figures than some applications. Instrumentation applications, such as network analyzers, can tolerate much higher noise figures. In most network analyzer applications, high isolation between the outgoing and incoming signal is important.

The photonic bi-directional interface disclosed in U.S. patent application Ser. No. 10/710,463 describes using both co-propagating and counter-propagating traveling waves to separate the outgoing and incoming signals. However, at lower frequencies, the photonic bi-directional interface described in U.S. patent application Ser. No. 10/710,463 does not operate efficiently because the traveling wave effects are diminished.

The photonic bi-directional interface of the present invention uses both a balanced and an unbalanced drive of a balanced drive device to separate the outgoing and incoming signals. The term "balanced drive device" as used herein refers to a two input device which generates an output that is proportional to the difference between a first and second signal applied to a first and second input, respectively. In other words, a balanced drive device is considered to be balanced because the gain from either of the two inputs to the output is the same. Thus, if the same signal is applied to both inputs of a balanced drive device, the difference between them will be zero and, therefore, the output of the balanced drive device will also be zero.

The term "unbalanced drive" is defined herein to mean driving a dual input device with only one input. When a signal is applied to only one input of the balanced drive, that signal will pass to the output of the balanced drive device.

The photonic bi-directional interface of the present invention is particularly well suited for radar, communication and instrumentation applications that require relatively low noise figure and where part or all of their operating bandwidth extends to or is at relatively low frequencies. Such interfaces have far superior performance to conventional bi-directional interfaces, such as directional coupler.

FIG. 1A illustrates a block diagram of a general bi-directional signal interface 10 according to the present invention that includes a general balanced drive device 12. The outgoing signal is applied to both a first input 14 and a second input 16 of the balanced drive device 12. In an ideal lossless balanced drive device, none of the outgoing signal appears at the output of the balanced drive device. The incoming signal is only applied to the first input 14 of the balanced drive device 12. A uni-directional device 18 is positioned between the first input 14 and a second input 16 of the balanced drive device 12 of the balanced drive device 12. The unidirectional device 18 prevents the input signal from propagating to the second input 16. In an ideal lossless balanced drive device, the incoming signal passes directly to the output 20 of the balanced drive device 12 without loss.

The bi-directional signal interface according to the present invention can be implemented using numerous types of balanced drive devices. For example, the bi-directional signal interface according to the present invention can be implemented using any one of several different modulator types depending upon the system requirements, such as the desired range of operating frequencies. FIGS. 1B-1E represent some examples of possible modulator types. However, it must be kept in mind that these examples are representative, but not exhaustive of the design possibilities that fall within the scope of the present invention. The bi-directional signal interface of the present invention can be implemented using a balanced or a differential amplifier.

Figure 1B:
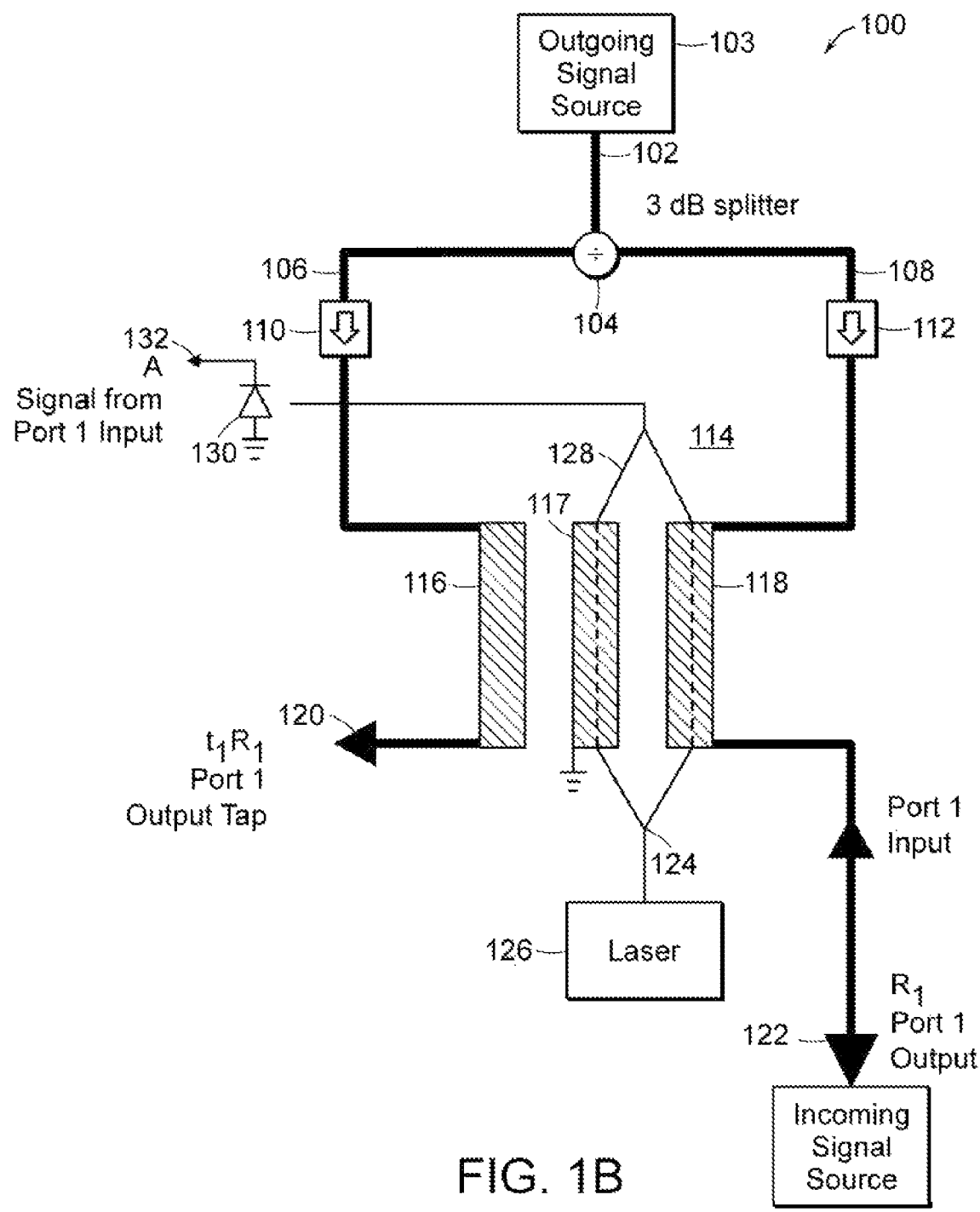
FIG. 1B illustrates a bi-directional signal interface according to one embodiment of the present invention that includes a balanced electro-optic modulator, an in-phase drive for the outgoing signal, and traveling wave electrodes for high frequency operation.

FIG. 1B illustrates a bi-directional signal interface 100 according to one embodiment of the present invention that includes a balanced electro-optic modulator, an in-phase drive for the outgoing signal, and traveling wave electrodes for high frequency operation. The bi-directional signal interface 100 is suitable for use with modulators where an in-phase electrical drive of the balanced electrodes results in in-phase optical modulation between the two optical arms of the modulator. The electrodes shown in FIG. 1B are so-called traveling wave electrodes, which are well known in the art to produce efficient modulation at high frequencies.

The bi-directional signal interface 100 includes an RF input port 102 that receives the input RF modulation signal from an outgoing signal source 103. A splitter 104 is coupled to the RF input port 102. A first 106 and second input RF transmission means 108 are coupled to the output of the splitter 104. The term "transmission means" is defined herein to mean any type of transmission line, such as a conductive wire for low frequency transmission and a RF transmission line suitable for high frequency transmission. The splitter 104 splits the RF drive signal into a first and a second signal that propagate in the first and second RF transmission means 106, 108, respectively. In the embodiment shown in FIG. 1B, the splitter 104 is a 3 dB splitter with an equal splitting ratio that splits the incoming RF signal into two equal signals.

In the embodiments shown in FIGS. 1B-1E, a first 110 and a second unidirectional element 112 are positioned in a respective one of the input waveguides 106, 108. The unidirectional elements 110, 112 provide isolation from signals traveling in a direction opposite to the signal path. In theory, only one unidirectional element is needed to isolate the dual-drive electrodes. However, in practice adding a second unidirectional element improves the symmetry of the output drive and, therefore, can improve the cancellation of the outgoing signal.

In some embodiments, the unidirectional elements 110, 112 are isolators. Isolators typically have relatively narrow bandwidth. In other embodiments, the unidirectional elements 110, 112 are RF amplifiers having reverse isolations that are much larger than their forward gain. Such amplifiers are commercially available and are commonly used in the RF art.

The bi-directional signal interface 100 also includes an electro-optic modulator 114. In the embodiment shown in FIG. 1B, the electro-optic modulator 114 is a Z-cut lithium niobate Mach-Zehnder interferometric modulator. Z-cut lithium niobate Mach-Zehnder interferometric modulator are sometimes desirable because they can be designed to have relatively low switching voltage, $V\pi$, which in turn can enable the bi-directional interface to have low noise figure. Numerous types of electro-optic modulator can be used. For example, the electro-optic modulator 114 can be one of an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic inorganic modulator, and an electro-optic organic modulator.

The electro-optic modulator 114 includes a first 116 and a second modulation electrode 118. A third electrode 117 is grounded. The first and second modulation electrodes 116, 118 are coupled to a respective one of the unidirectional elements 110, 112. The first and second modulation electrodes 116, 118 can be either lumped element or traveling wave electrodes depending upon the desired frequency of operation. One feature of the signal interface of the present invention is that is operates at low frequencies down to DC.

Another feature of the signal interface of the present invention is that it can operate in a traveling wave mode which can further improve transmit and receive isolation as described in U.S. patent application Ser. No. 10/710,463, filed Jul. 13, 2004, and entitled "Bi-Directional Signal Interface" and U.S. patent application Ser. No. 11/353,701, filed Feb. 14, 2006, and entitled "Bi-Directional Signal Interface Using Photonic Coupler."

The electro-optic modulator 114 shown in FIG. 1B is referred to as a balanced dual-drive modulator because there are two modulation inputs (i.e. two drives) and because the first and second modulation electrodes 116, 118 have approximately the same length. In other embodiments, the electro-optic modulator 114 is an unbalanced modulator where the first and the second modulation electrodes 116, 118 have different lengths as is discussed further in connection with FIG. 2.

The output of the first modulation electrode 116 of the electro-optic modulator 114 is a tap port 120. The tap port 120 provides a portion of the outgoing RF signal. In the embodiment shown in FIG. 1B, one half of the outgoing RF signal propagates through the tap port 120. In lumped element designs, the tap port 120 is open (not terminated). In distributed or traveling wave designs, the tap port 120 is terminated with the characteristic impedance of the transmission line comprising the first electrode 116. The signal propagating on the first electrode 116 to the tap port 120 is isolated from the signals propagating on the second modulation electrode 118.

The output of the second electrode 118 of the electro-optic modulator 114 is the bi-directional port 122 of the bi-directional signal interface 100. The bi-directional port 122 provides a portion of the outgoing RF signal. In the embodiment shown in FIG. 1B, one half of the outgoing RF signal propagates through the bi-directional port 122. The bi-directional port 122 also receives a second RF signal, such as a reflected RF signal from a network under test if the bi-directional signal interface 100 is configured for a network analyzer application. The incoming RF signal modulates the optical signal applied to the input 124 of the electro-optic modulator 114 as described below. In practice, the bi-directional port 122 can be implemented in numerous ways depending on the characteristics of the signal propagating through the port, such as the frequency range and the power of the signal. Specific embodiments of the bi-directional port 122 are described herein in connection with FIGS. 6A and 6B.

The electro-optic modulator 114 includes an optical input 124 that receives an optical signal from an optical source 126. For example, the optical source 126 can be a semiconductor laser or another laser that generates an optical beam at an output. In various embodiments, the optical source is a continuous wave (CW) optical beam, a pulsed optical beam, a sinusoidal optical beam, and a frequency swept sinusoidal optical beam. The electro-optic modulator 114 also includes an optical output 128, which is coupled to the optical input of optical detector 130. The RF output of optical detector 130 at port 132 of the bi-directional signal interface 100 receives the incoming RF signal from the Port 1 input. The electro-optic modulator 114 generates a modulated optical signal at port 132.

Figure 1C:
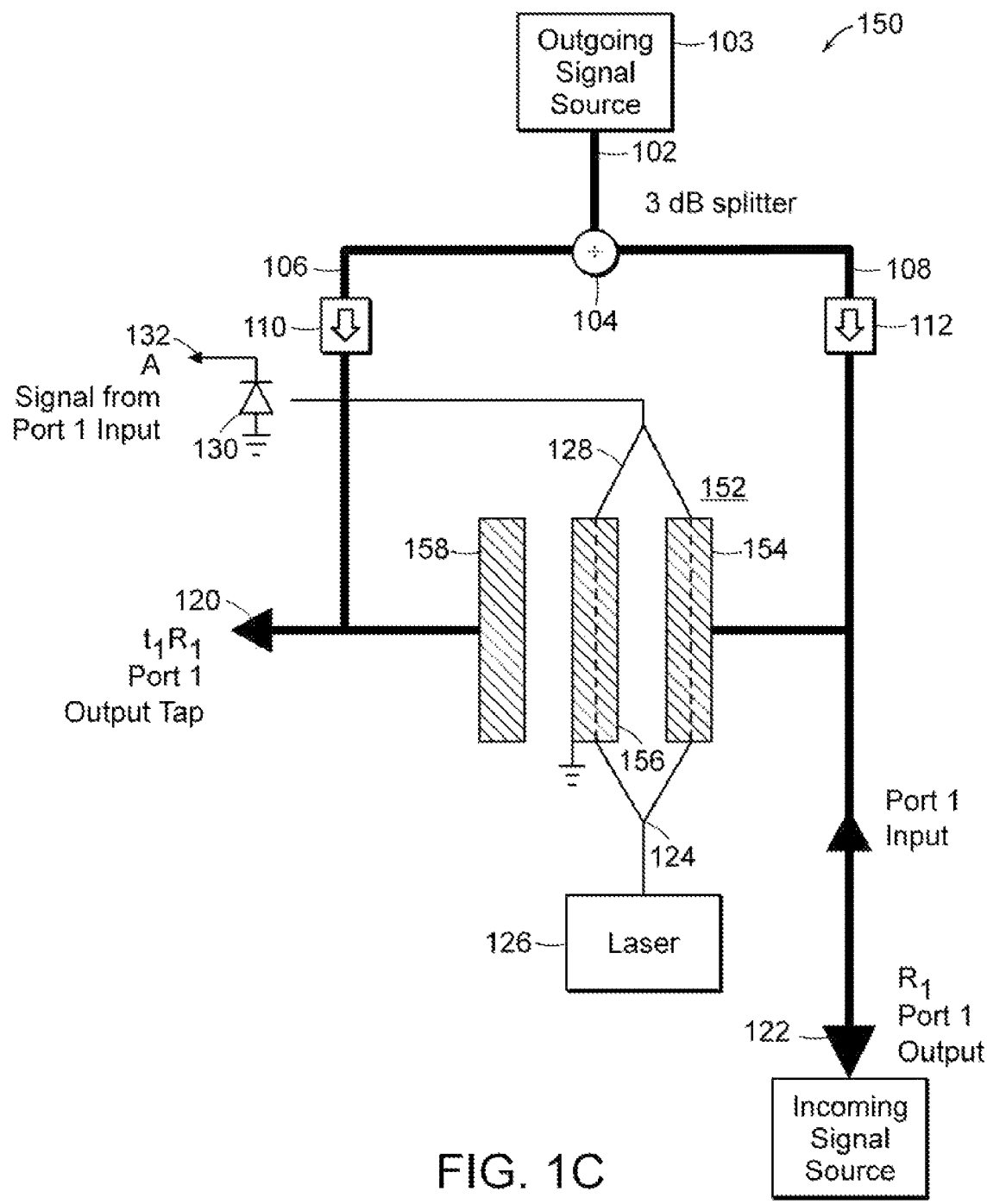
FIG. 1C illustrates a bi-directional signal interface according to one embodiment of the present invention that includes a balanced electro-optic modulator, an in-phase drive for the outgoing signal, and lumped-element electrodes for low frequency operation (down to DC).

FIG. 1C illustrates a bi-directional signal interface 150 according to one embodiment of the present invention that includes a balanced electro-optic modulator 152, an in-phase drive for the outgoing signal, and lumped-element electrodes 154, 156, and 158 for low frequency operation (down to DC). The bi-directional signal interface 150 is similar to the bi-directional signal interface 100 of FIG. 1B. The electro-optic modulator 152 is also a Z-cut lithium niobate Mach-Zehnder interferometric modulator. However, the electrodes 154, 156, and 158 are so-called lumped element electrodes. These lumped element electrodes 154, 156, and 158 are well known in the art to produce efficient modulation at low frequencies, even down to DC.

Figure 1D:
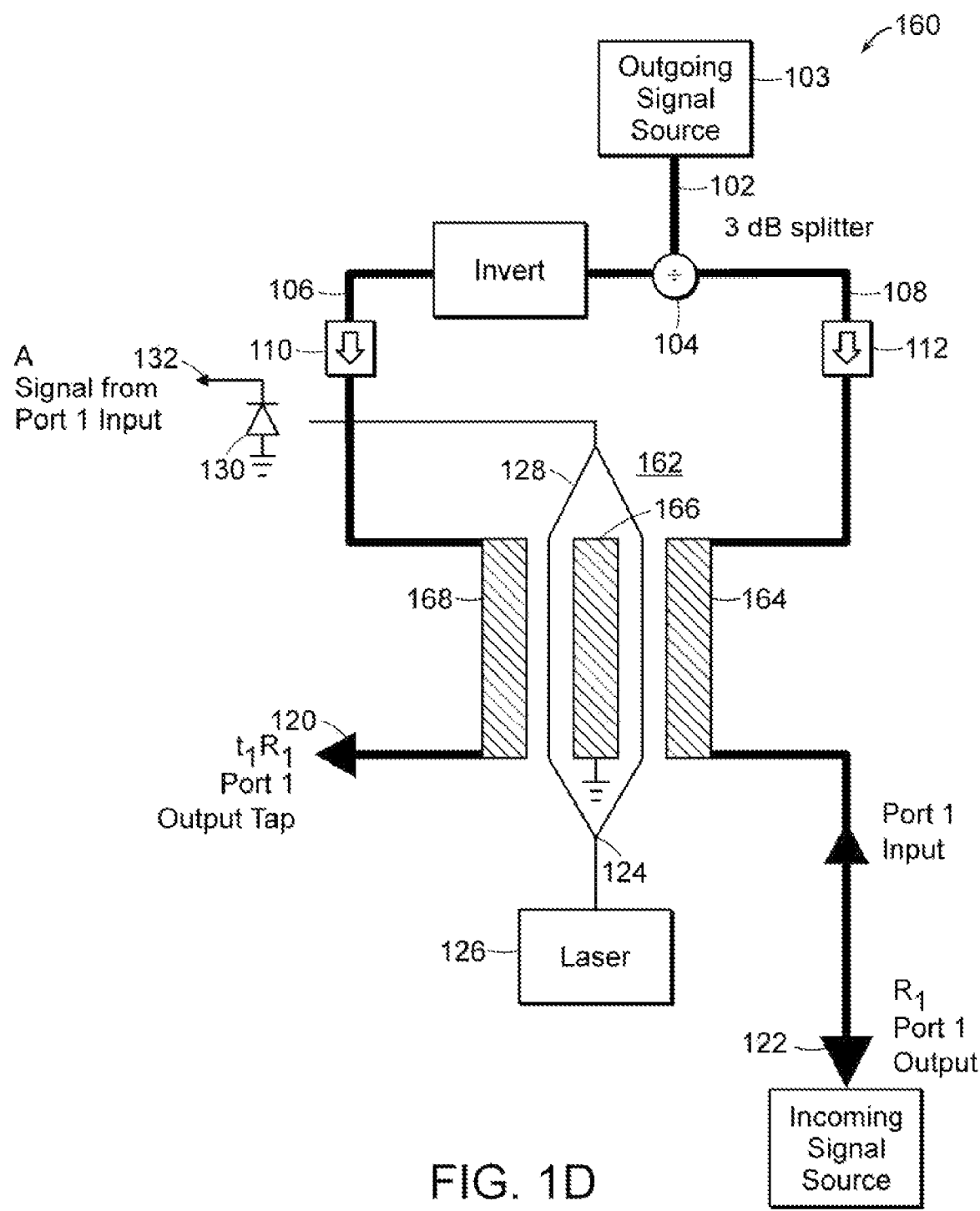
FIG. 1D illustrates a bi-directional signal interface according to one embodiment of the present invention that includes a balanced electro-optic modulator, a differential drive for the outgoing signal, and traveling wave electrodes for high frequency operation.

FIG. 1D illustrates a bi-directional signal interface 160 according to one embodiment of the present invention that includes a balanced electro-optic modulator 162, a differential drive for the outgoing signal, and traveling wave electrodes 164, 166, 168 for high frequency operation. The bi-directional signal interface 160 is similar to the bi-directional signal interface 100 of FIG. 1B. However, the electro-optic modulator 162 is an X-cut lithium niobate Mach-Zehnder interferometric modulator. The traveling wave electrodes 164, 166, 168 are well known in the art to produce efficient modulation at high frequencies. In particular, the bi-directional signal interface 160 is well suited for use with modulators where a complementary (i.e. 180 degree out-of-phase) electrical drive of the balanced electrodes results in in-phase optical modulation between the two optical arms of the modulator.

Figure 1E:
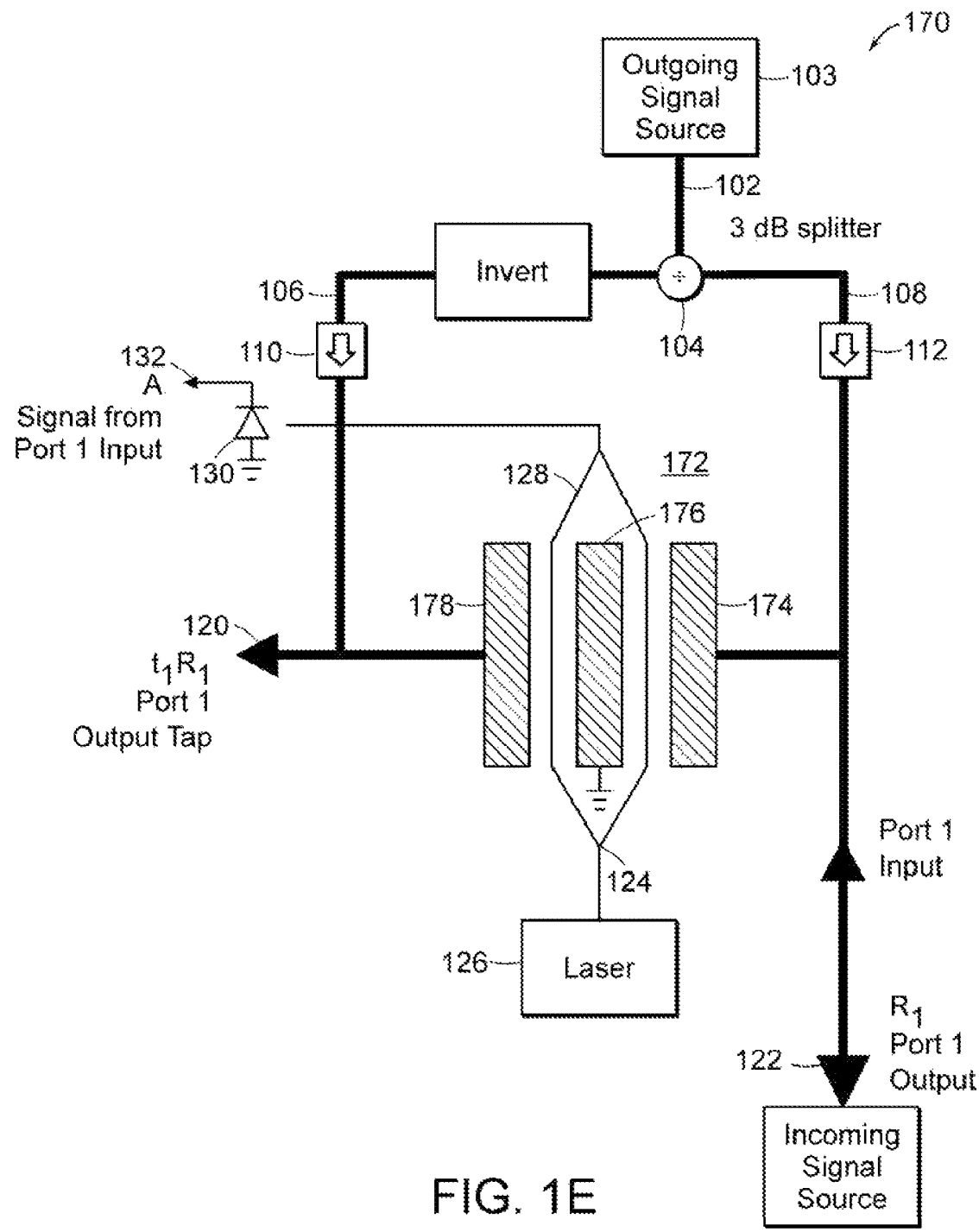
FIG. 1E illustrates a bi-directional signal interface according to one embodiment of the present invention that includes a balanced electro-optic modulator, an in-phase drive for the outgoing signal, and lumped-element electrodes for low frequency operation (down to DC).

FIG. 1E illustrates a bi-directional signal interface 170 according to one embodiment of the present invention that includes a balanced electro-optic modulator 172, differential drive for the outgoing signal, and lumped-element electrodes 174, 176, and 178 for low frequency operation (down to DC). The bi-directional signal interface 150 is similar to the bi-directional signal interface 100 of FIG. 1C. However, the electro-optic modulator 172 is an X-cut lithium niobate Mach-Zehnder interferometric modulator. Also, the electrodes 174, 176, and 178 are so-called lumped element electrodes, which are well known in the art to produce efficient modulation at low frequencies, even down to DC.

Figure 1F:
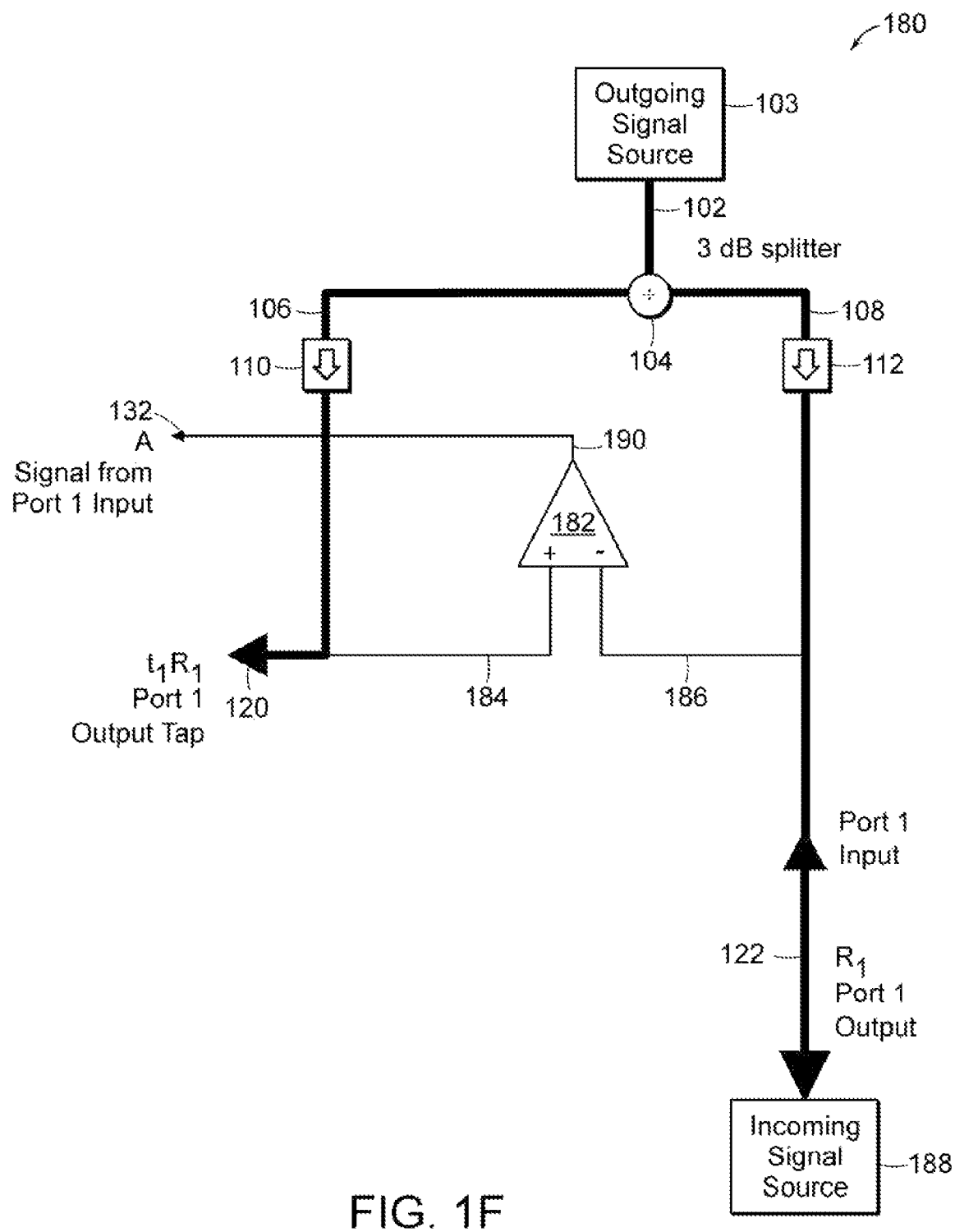
FIG. 1F illustrates a bi-directional signal interface according to one embodiment of the present invention that includes an electronic balanced or differential amplifier.

FIG. 1F illustrates a bi-directional signal interface 180 according to one embodiment of the present invention that includes an electronic balanced or differential amplifier. The bi-directional signal interface 180 is similar to the bi-directional signal interfaces 100, 150, 160, and 170 of FIGS. 1B-1E. However, the bi-directional signal interface 180 includes a balanced or differential amplifier rather than an optical modulator.

The bi-directional signal interface 180 includes a differential amplifier 182. The differential amplifier 182 includes a first 184 and a second RF input 186, which are coupled to a respective one of the unidirectional elements 110, 112. In some embodiments, the differential amplifier 182 is a balanced amplifier where the gain from the RF inputs 184, 186 is substantially the same. In other embodiments, the differential amplifier 182 is an unbalanced amplifier where gain from the first input 184 is different from the gain from the second input 186. Numerous types of differential amplifiers can be used. For example, for low frequency applications, the differential amplifier 182 can be an operational amplifier. For higher frequency applications and/or applications requiring low noise figure, the differential amplifier 182 can be a differential low noise amplifier (LNA).

The first RF input 184 can be directly connected to the tap port 120 if the impedance of the first RF input 184 is sufficiently higher than the impedance of the transmission means 106. Similarly, the second RF input 186 can be directly connected to the output port 122 if the impedance of the second RF input 186 is sufficiently higher than the impedance of the transmission means 108. However, if the impedance of the first and second RF inputs 184, 186 is equal to the impedance of the transmission means 106, 108, then a splitter can couple the first and second RF inputs 184, 186 to a respective one of the outputs of unidirectional devices 112 and 110.

The output of the first unidirectional device 110 is directly connected to tap port 120. The tap port 120 provides a portion of the outgoing RF signal. In the embodiment shown in FIG. 1F, one half of the outgoing RF signal propagates through the tap port 120. In lumped element embodiments, the tap port 120 is open (not terminated). In distributed or traveling wave embodiments, the tap port 120 is terminated with the characteristic impedance of the transmission means 106.

The bi-directional port 122 provides a portion of the outgoing RF signal. In the embodiment shown in FIG. 1F, one half of the outgoing RF signal propagates through the bi-directional port 122. The bi-directional port 122 also receives an incoming RF signal, such as a reflected RF signal from a radar or a signal reflected from a network under test (if the bi-directional signal interface 180 is configured for a network analyzer application). In embodiments where the bi-directional signal interface 180 is configured for a communication system, the incoming RF signal is the receive signal.

In practice, the bi-directional port 122 can be implemented in numerous ways depending on the characteristics of the signal propagating through the port, such as the frequency range and the power of the signal. Specific embodiments of the bi-directional port 122 are described herein in connection with FIGS. 6A and 6B.

The incoming RF signal propagates only in the second RF input 186 of the differential amplifier 182. Hence ideally none of the incoming RF signal reaches the first RF input 184 of the differential amplifier 182. The differential amplifier 182 amplifies the difference between the first and second RF inputs 184 and 186. Since the incoming RF signal is applied to only one input, the RF output 188 of differential amplifier 182 contains an amplified version of the incoming RF signal. Consequently the incoming RF signal propagates through Port A 132.

The differential amplifier 182 provides electrical isolation so that the signal at the tap port 120 is isolated from the signals at the output port 122. It is well known in the art that differential amplifiers amplify the difference between the signals applied to the first 184 and to the second RF input 186. When the same signal is applied to both the first 184 and the second RF input 186 of the differential amplifier 182, virtually none of the outgoing signal 103 will appear at the output 188 of differential amplifier 182. Thus, when the same signal is applied to both the first 184 and the second RF input 186 of the differential amplifier 182, port A 132 is effectively isolated from the outgoing signal source 103. One feature of the bi-directional signal interface 180 is that it operates efficiently at low frequencies down to DC.

Figure 2:
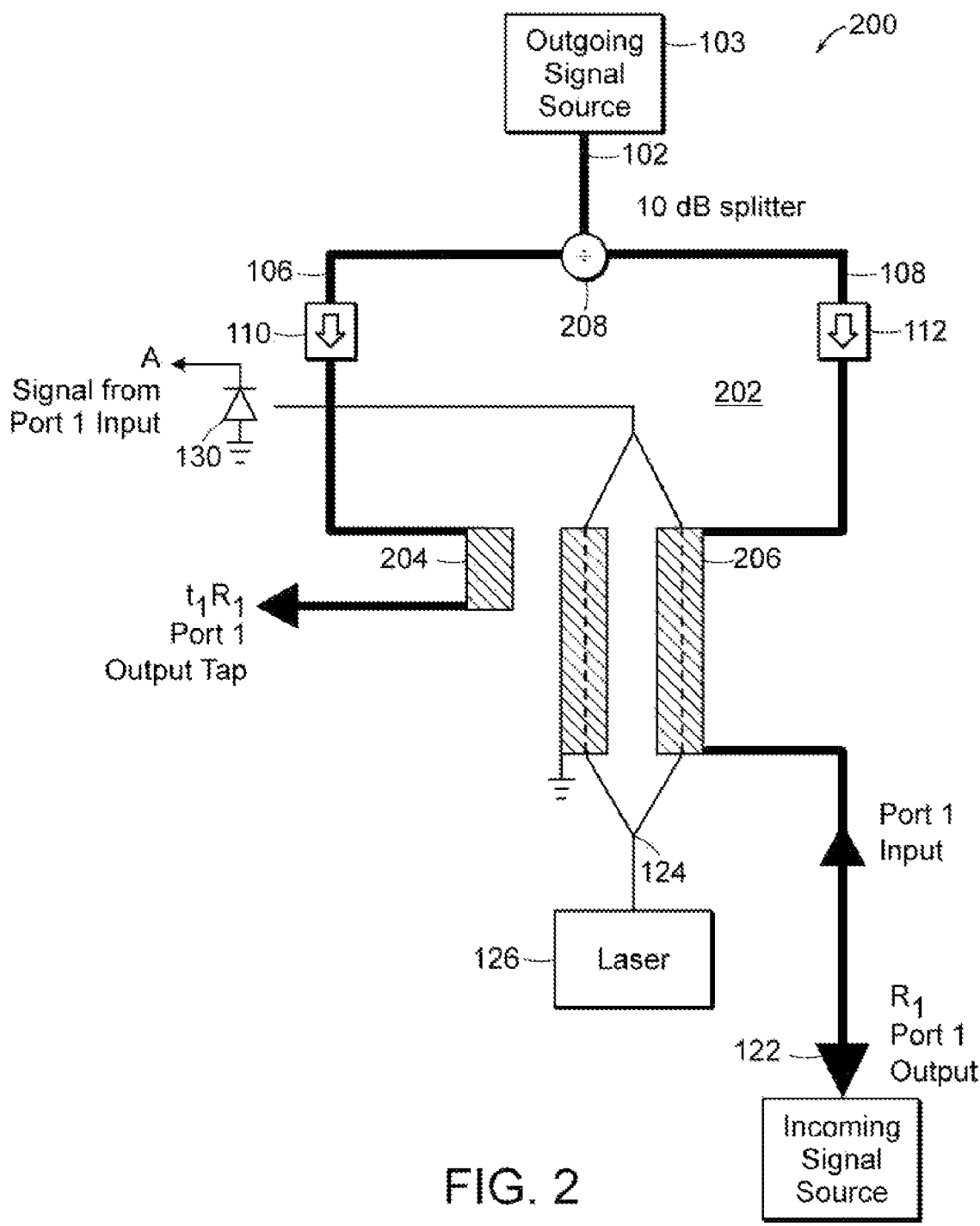
FIG. 2 illustrates a bi-directional signal interface according to one embodiment of the present invention that includes an un-balanced electro-optic modulator.

FIG. 2 illustrates a bi-directional signal interface 200 according to one embodiment of the present invention that includes an un-balanced electro-optic modulator. Un-balanced electro-optic modulators can be used with any of the embodiments shown in FIGS. 1B-1E. The bi-directional signal interface 200 illustrated in FIG. 2 is similar to the bi-directional signal interface 100 that was described in FIG. 1B. However, the electro-optic modulator 202 is unbalanced, meaning that the first 204 and the second electrode 206 do not have equal lengths. In addition, the splitter 208 is not a 3 dB splitter with a one-to-one splitting ratio. Instead, the splitting ratio of the splitter 208 is some ratio that is determined by the relative sizes of the first and second electrodes 204, 206.

Thus, in one embodiment, the splitting ratio of the splitter 208 and the ratio of the lengths of the first and second modulation electrodes 204, 206 are chosen to result in first and second modulation signals that are in-phase with respect to each other and that have approximately equal amplitudes. In particular, in unbalanced modulator embodiments, the splitting ratios are chosen so that the stronger signal is applied to the shorter modulation electrode and the weaker signal is applied to the longer modulation electrode.

Referring to FIGS. 1B-E and FIG. 2, a method of interfacing an outgoing electrical signal with an incoming electrical signal according to the present invention includes receiving an optical signal at the optical input 124 of the electro-optic modulator 114. An outgoing RF signal is received at the RF input port 102 of the bi-directional signal interface 100. The splitter 104, splits outgoing RF signal into a first and a second outgoing RF signal with the predetermined splitting ratio. In some embodiments, the splitting ratio is one-to-one and the first and second modulation electrodes 116, 118 are chosen to have the same length. In these embodiments, the amplitude of the first portion of the outgoing RF signal is approximately equal to the amplitude of the second portion of the outgoing RF signal. In other embodiments (shown in FIG. 2), the splitting ratio is determined by the ratio of the first and second modulation electrodes 204, 206. In these embodiments, the amplitude of the first portion of the outgoing RF signal is not equal to the amplitude of the second portion of the outgoing RF signal.

An incoming RF signal is received at the bi-directional port 122 of the bi-directional signal interface 100. The electro-optic modulator 114 enables the incoming electrical signal to modulate the optical signal while isolating the first and second outgoing RF signals from the incoming electrical signal. The modulated incoming RF signal is detected at port 132 by the optical detector 130. In some embodiments, the first and the second modulation electrodes approximately velocity match the RF fields of the incoming electrical signal to the optical field of the optical signal.

It has been shown, both theoretically and experimentally, that it is possible to fabricate external modulation links with low RF-to-RF loss or even with some RF power gain. See, for example, U.S. Pat. No. 5,287,212, entitled "Optical Link." Therefore, a bi-directional interface of the present invention can impose very low coupling losses on the incoming signal and, in some embodiments, can even add gain.

The bi-directional signal interface of the present invention has numerous applications. One particular application is a high performance S-parameter test set for an RF network analyzer. A high performance S-parameter test set for a network analyzer can be constructed with one or more of the bi-directional signal interfaces of the present invention. RF network analyzers are common test instruments that characterize a network under test. The term "network under test" can be anything from a single device to a complex network. Network analyzers simultaneously excite the network under test and detect signals reflected from and transmitted through the network.

Network analyzers determine the so called "S-parameters" or scattering matrix of the network under test. A scattering matrix is a complete description of a network as seen by its N ports. In particular, a scattering matrix relates the voltage signal incident on the ports to voltage signals reflected from the ports. Specific scattering parameters are defined by the following equation:

$$S_{ij} = \frac{V_i^-}{V_j^+}\bigg|_{V_k^+=0, k \neq j}$$

The scattering parameter $S_{ij}$ is found by driving port j with an incident voltage signal $V_j^+$, and measuring the reflected wave amplitude $v_i^-$ transmitted from port i. The incident signals on all ports except the $j^{th}$ port are set to zero during the measurement. In practice, this means that all ports are terminated in matched loads to eliminate reflections. Thus, the S-parameter $S_{ii}$ is the reflection coefficient seen looking into port i when all other ports are terminated in a matched load, and S-parameter $S_{ij}$ is the transmission coefficient from port j to port i when all other ports are terminated with a matched load.

Scattering parameters are measured directly with a network analyzer. Scalar network analyzers measure only the magnitude of detected signals. Vector network analyzers measure both the magnitude and the phase of detected signals. The bi-directional signal interface of the present invention can be used to construct both scalar and vector network analyzers. In particular, the bi-directional signal interface of the present invention can be used to simultaneously supply and detect signals, while preserving the magnitude and phase information of both the outgoing and incoming signals.

FIG. 3A illustrates signal diagrams of RF signal paths in an S-parameter network analyzer 300 that analyzes a two port network under test 302. The network analyzer 300 generates a first outgoing signal, which is referred to herein as the first transmission RF signal 304, which is labeled $R_1$. The first transmission RF signal propagates into the first port 306 of the network under test 302. A portion of the first transmission signal, which is labeled $t_1R_1$, is tapped at a first tap port 308. A portion of the first transmission signal 304, which is labeled A, is reflected from the first port 306 of the network under test 302 back into the signal path and made available at port 316.

Similarly, the network analyzer 300 generates a second outgoing signal, which is referred to herein as the second transmission RF signal 310, which is labeled $R_2$. The second transmission RF signal propagates into the second port 312 of the network under test 302. A portion of the second transmission RF signal, which is labeled $t_2R_2$, is tapped at a second tap port 314. The second transmission RF signal propagates in the second port 312 of the network under test 302. A portion of the second transmission signal 310, which is labeled B, is then reflected from the second port 312 of the network under test 302 back into the signal path and made available at port 318.

FIG. 3B illustrates the mathematical equations for the S parameters using the signal labels in the signal diagrams shown in FIG. 3A. The S parameter $S_{11}$ and $S_{22}$ are the reflection coefficients for the first 306 and the second port 312, respectively, of the network under test 302. The S parameter $S_{12}$ is the transmission coefficient representing transmission from the second port 312 to the first port 306. The S parameter $S_{21}$ is the transmission coefficient representing transmission from the first port 306 to the second port 312.

Network analyzers require bi-directional interfaces because the transmission and reflection signals propagate to and from the ports on the same transmission means. The reflected signals cannot be switched away from the port to measure power. Known network analyzers typically couple a portion of the outgoing signals with a coupler and measure the signal power of the coupled portion. Designers must, however, ensure that the coupler used to couple the portion of the outgoing signal has the same frequency response as the port of the network analyzer in order for the coupled signal to faithfully represent the port output at all frequencies.

There are three known means for simultaneously coupling both the outgoing and incoming signals to and from a network under test: (1) a resistive power divider; (2) a directional bridge; and (3) a directional coupler. Directivity is an important figure of merit for network analyzers. Directivity is well known in the RF art as a measure of how well the coupler isolates two opposite-traveling signals. The directivity of a power divider is 0 dB because the outgoing-to-incoming isolation is equal to the incoming signal path loss. The directivity of a directional bridge and a directional coupler is relatively high because the reverse coupled signals are typically very small.

Ideally a directional coupler provides infinite isolation of the outgoing signal into the incoming signal path. However, in practice this isolation is high, but not infinite. A typical directional coupler has an isolation of about 50 dB. Since the incoming signal is attenuated as well, the net improvement provided by the directional coupler is the ratio of the isolation to the coupling loss in the incoming signal path. This parameter is defined as the directivity of the coupler. In the above example, the directivity would be 50−20=30 dB, where subtraction in the logarithmic dB scale has replaced taking the ratio.

Another important figure of merit for network analyzers is bandwidth. Directional couplers are almost universally preferred over power dividers and directional bridges in applications such as network analyzers because they have sufficient bandwidth for most applications.

Another important figure of merit for network analyzers is coupling loss. The coupling factor of a directional coupler should be the same in both the forward and reverse directions. It is desirable to have the outgoing signal be as small as possible. However, the less power coupled in the outgoing direction, the greater the loss introduced into the incoming signal path. Thus, the coupling loss of a directional coupler fundamentally sets a lower bound on the minimum noise figure of the incoming signal path that can be achieved with a directional coupler implementation.

Typical directional couplers used in network analyzers have a coupling loss of about 20 dB. The impact of the coupling loss causes a loss of one part in 100 on the through loss, which has a negligible impact on the outgoing signal. The incoming path coupling loss occurs before any amplification of the incoming signal.

A bi-directional signal interface according to the present invention has lower coupling losses and, therefore, improved noise figure performance compared with known bi-directional interfaces. A bi-directional signal interface according to the present invention also has increased directivity, increased signal-to-noise dynamic range, and increased bandwidth compared with known bi-directional interfaces.

Figures 4A, 4B:
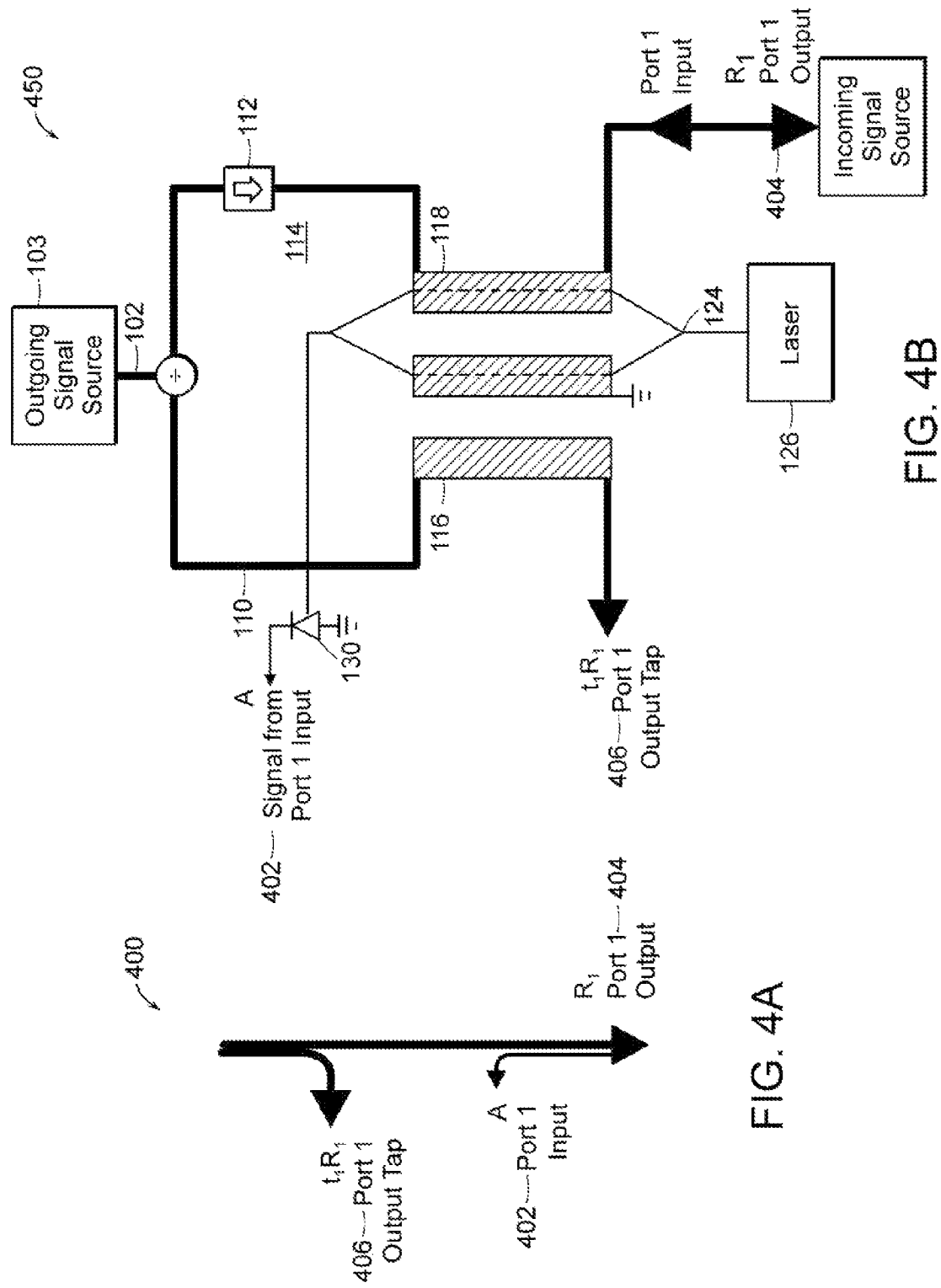
FIG. 4A illustrates a signal diagram of a bi-directional interface for an S-parameter test set of a network analyzers.
FIG. 4B illustrates a bi-directional interface according to the present invention that is designed for an S-parameter test set of a network analyzer.

FIG. 4A illustrates a signal diagram 400 of a bi-directional interface for an S-parameter test set of a network analyzers. The signal diagram 400 includes port 402 that receives signals reflected from a network under test but little (ideally none) of the outgoing signal. The signal diagram 400 also includes a bi-directional port 404 that transmits signals to and receives signals from the network under test. In addition, the signal diagram 400 includes a tap port 406 that taps a portion of the signal being transmitted to the network under test, but little (ideally none) of the incoming signal.

FIG. 4B illustrates a bi-directional interface 450 according to the present invention that is designed for an S-parameter test set of a network analyzer. The bi-directional interface 450 is a high performance alternative to the directional couplers used in conventional network analyzers. The bi-directional interface 450 is similar to the bi-directional interface with the balanced electro-optic modulator that was described in connection with FIG. 1B. However, the interface 450 shows only one unidirectional element 112. A second unidirectional element can be used as described in connection with FIG. 1B. In the embodiment shown in FIG. 4B, the first and second modulation electrodes 116, 118 of electro-optic modulator 114 have the same length. In other embodiments, as described in connection with FIG. 2, the first and second modulation electrodes 116, 118 have different lengths.

The bi-directional interface 450 includes the input port 402, bi-directional port 404, and the output tap port 406 that was described in connection with FIG. 4A. These ports can be open or terminated in characteristic impedances depending upon how the network analyzer is configured. Signals propagating through the tap port 406 and through the bi-directional port 404 propagate along identical electrodes. Consequently, the two signals have the same frequency response, which insures the accuracy of the S-parameter measurement.

A network analyzer according to the present invention uses separate modulation paths in an electro-optic modulator to separate the outgoing signal from the incoming signal. Referring to FIG. 4B, the electrical splitter 104 directs a first portion of the outgoing electrical signal to an input port of the first electrode 116 of the electro-optic modulator 114 and a second portion of the outgoing electrical signal to an input port of the second electrode 118 of the electro-optic modulator 114. The laser 126 generates an optical signal. In some embodiments, the electro-optic modulator 114 is designed to velocity match the RF field of the incoming electrical signal to the optical field of the optical signal.

The outgoing signal is divided equally and applied to each of the first and the second electrodes 116, 118 of the electro-optic modulator 114. Both the first and the second portions of the outgoing signals have the same amplitude and phase. Applying the same signal (i.e. signals with equal amplitude and phase) to both electrodes 116, 118 of the dual-drive electro-optic modulator 114 generates equal modulations of the optical carrier, which will result in zero modulation of the carrier. Therefore, there is no "leakage" of the outgoing signal into the incoming path.

Thus, the electro-optic modulator 114 is driven with a balanced or common mode drive that results in the same modulation being applied to both modulator arms to achieve zero net modulation. Signal interfaces according to the present invention use this common mode drive to produce the desired isolation of the outgoing signal from the incoming. Operating the electro-optic modulator 114 with a common mode drive is in contrast to prior art operation of such modulators which use an un-balanced or differential drive that applies drive signals 180 degrees out-of-phase to each modulator arm to provide efficient modulation.

The isolation of the signal interface of the present invention is determined by the degree to which the two portions of the outgoing signal are equal and the degree in which circuit parameters, such as the impedance match to the electrodes 116, 118, the length of electrodes 116, 118, and the overlap integral between the RF and optical fields are equal. If the two modulated signals and the circuit parameters are equal, then the isolation is infinite. However, if the two portions of the outgoing signals and/or the circuit parameters are not exactly equal there will be some resultant modulated signal that will reduce the isolation.

The bi-directional port 404 of the second electrode 118 of the electro-optic modulator 114 is coupled to a port of a network under test. The outgoing signal propagates through the bi-directional port 404 and into the port of a network under test. The power of the outgoing signal propagating through the port of a network under test is only one half the power of the signal applied to the RF input port 102. This loss in signal sensitivity is not significant for many applications, such as network analyzer applications, and is well tolerated for the significant improvements in bandwidth provided by the bi-directional interface of the present invention.

The electro-optic modulator 114 modulates the incoming electrical signal from the network under test on the optical signal while isolating the outgoing electrical signal from the incoming electrical signal. As described herein, the electro-optic modulator 114 can be a balanced modulator or an unbalanced modulator. The optical detector 130 detects the modulated incoming electrical signal.

The bi-directional signal interface of the present invention can also replace some non-reciprocal RF components that are commonly used in RF systems, such as radar systems. The bi-directional signal interface of the present invention is desirable because it can have significantly greater bandwidth compared with known non-reciprocal RF components.

The incoming signal drives only one electrode of the electro-optic modulator, whereas the outgoing signal drives both electrodes. The single drive embodiment for the incoming signal results in half the modulation efficiency that is obtained by having the incoming signal drive both electrodes (push-pull) as is conventionally done in the state of the art. Consequently, by driving only one electrode with the incoming signal, there is a decrease in the sensitivity and, therefore, an increase in the noise figure for the incoming signal.

The noise figure of a conventional directional coupler has been compared with the noise figures of the bi-directional interface of the present invention with a single drive. In addition, the noise figure of a conventional directional coupler has been compared with the noise figures of the bi-directional interface that was described in connection with U.S. patent application Ser. No. 10/710,463 with a dual-drive electro-optic modulator. The noise figure of a conventional directional coupler is typically 20 dB. The noise figure of the bi-directional interface of the present invention with the single-drive of the electro-optic modulator for the input signal was calculated to be about 6 dB. The noise figure of the bi-directional interface, as described in connection with U.S. patent application Ser. No. 10/710,463, with the dual-drive of the electro-optic modulator for the input signal was calculated to be approximately 3 dB.

The noise figure data indicates that the sensitivity penalty for using only a single drive electro-optic modulator, as measured in terms of noise figure, is problematic if one were attempting to build a system that achieves the lowest possible noise figure. However, the increased noise figure is still substantially less than the minimum noise figure imposed by the coupling loss of the directional coupler. Consequently, the bi-directional signal interface of the present invention that uses the photonic coupler described herein offers a significant improvement in noise figure over the conventional RF devices. The incoming signal must be isolated from the second electrode 118 (FIG. 1B-E) to achieve good noise figure performance.

Furthermore, it has been shown that by using a local oscillator signal to modulate a nominally CW laser that feeds an electro-optic modulator, one can perform the first stage of RF down-conversion on the incoming signal. See Helkey, R., Twitchell, J. and Cox, C. H. III, "A down-converting optical link with RF gain", J. Lightwave Technol., vol 15, pp 956-61, 1997. Such a technique can reduce the complexity and further improve the performance of the bi-directional interface of the present invention for some communication and network analyzer applications.

FIG. 5 is a table 500 that presents data which compares RF performance of conventional directional coupler used in commercially available network analyzers to RF performance of the bi-directional interface of the present invention. The table 500 presents data for parameters including: bandwidth; outgoing-to-incoming isolation; outgoing signal gain; incoming signal gain; directivity; signal-to-noise dynamic range for −10 dBm outgoing signal level, and noise figure for incoming signal.

Data are presented in table 500 for a conventional directional coupler and for actual measured and estimated data for the bi-directional interface of the present invention. The data presented in table 500 for the conventional directional coupler was measured with a directional coupler that is commercially available through Krytar Corporation in Sunnyvale, Calif. The table 500 indicates that the measured and calculated data for the bi-directional coupler of the present invention has superior performance for each parameter.

Figure 6A:
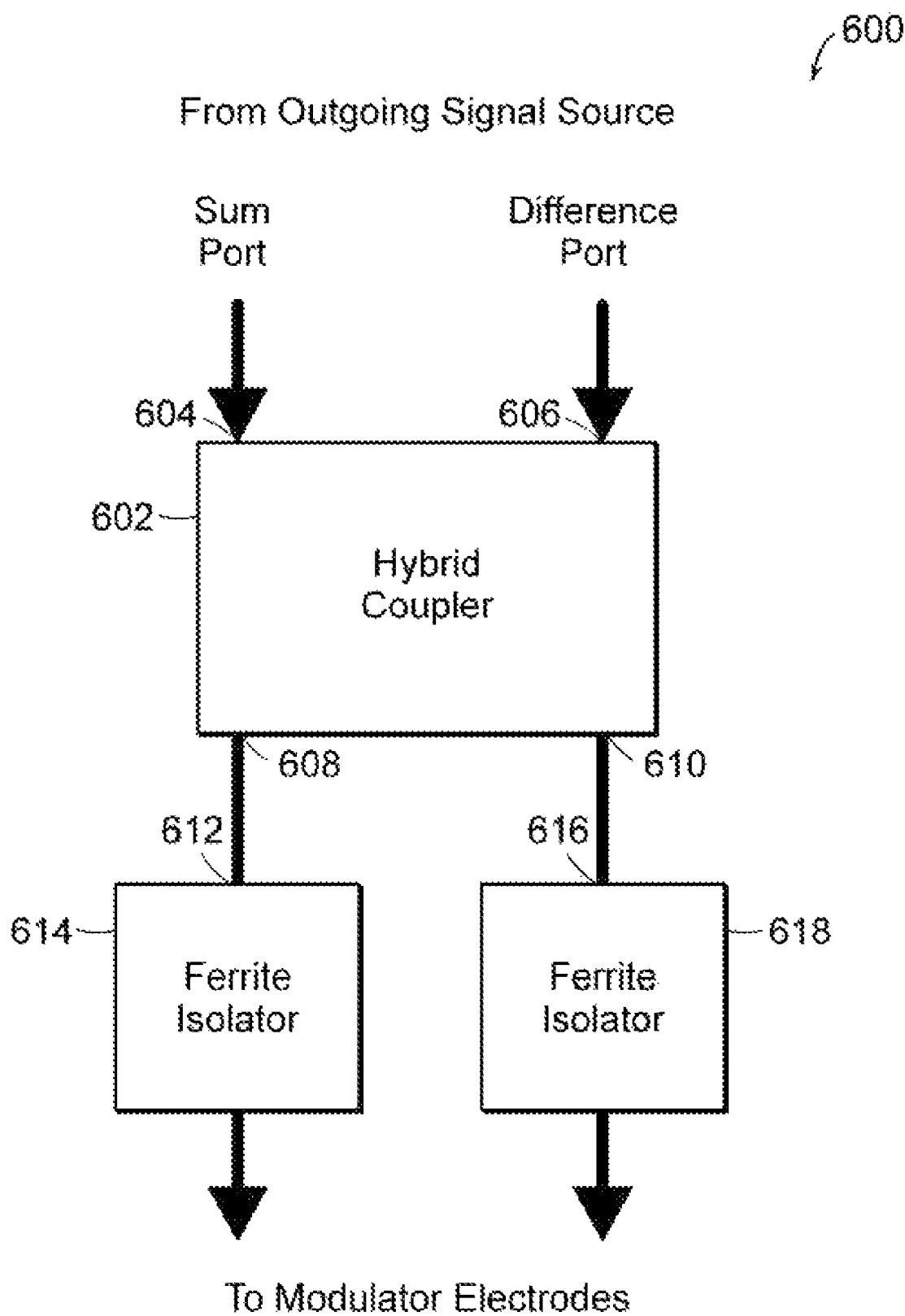
FIG. 6A illustrates one embodiment of the means for connecting the outgoing signal source to the modulator electrodes of the present invention that uses passive RF components.

FIG. 6A illustrates one embodiment of the means for connecting the outgoing signal source to the modulator electrodes of the present invention that uses passive RF components. This embodiment is particularly well suited to high frequency operation. The connecting means 600 includes a hybrid coupler 602, which includes a sum input port 604 and a difference input port 606 that are configured to receive the outgoing signals.

The outgoing signal source 103 (FIG. 1B) can be connected to either one of the sum input port 604 or the difference input port 606 depending on the desired phase relationship between the first 608 and second hybrid coupler output port 610. Applying the outgoing signal to the sum input port 604 will produce two, in-phase signals at the first and second output ports 608, 610 of the hybrid coupler 602. Applying the signal to the difference port 606 will produce two complementary signals, i.e. two signals that are 180 degrees out-of-phase with respect to one another at the first 608 and second output port 610. Thus, the hybrid coupler 602 can be configured to provide either the in-phase or the complementary phase drives that are described in connection with FIG. 1B-1E.

The first output port 608 is connected to an input 612 of the first isolator 614. The second output port 610 is connected to an input 616 of the second isolator 618. For example, the first and second isolators 614, 618 can be ferrite isolators as shown in FIG. 6A. Ferrite isolators are components that are well known in the RF art.

As described in connection with FIG. 1B, in theory, only one of the first and second isolators 614, 618 is required. However, since the portion of outgoing-to-incoming isolation is directly dependent on the ability to generate identically modulated optical signals, it is imperative to maintain a balance between the two paths of the outgoing signal source to the modulator electrodes. This balance can be maintained by using the two ferrite isolators 614, 618.

One feature of the connecting means 600 is that an impedance match can be obtained between the source and the modulator electrodes. Another feature of the connecting means 600 is its ability to provide outgoing-to-incoming isolation at low frequencies, even at DC. The bi-directional interface of the present invention can be specifically designed for low frequency or DC operation. However, hybrid couplers and ferrite isolators which operate at low frequencies and at DC are typically bulky devices that are inconvenient to use in bi-directional interfaces. These devices are bulky because they are magnetically coupled devices and the desired magnetic fields require magnets that have substantial volume.

Figure 6B:
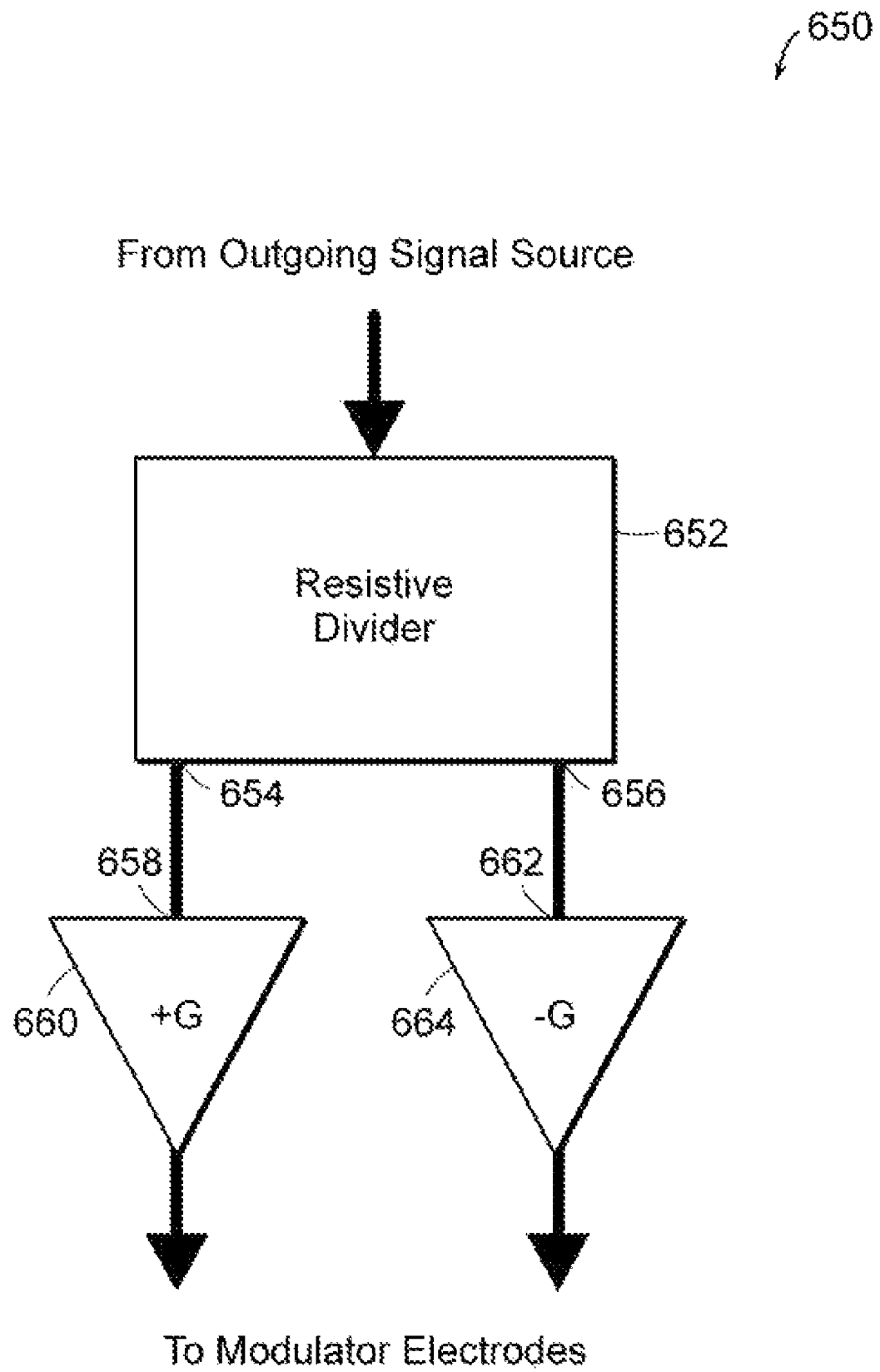
FIG. 6B illustrates an alternate embodiment of the connecting means of the bi-directional signal interface of the present invention that uses a combination of active and passive RF components.

FIG. 6B illustrates an alternate embodiment of the connecting means 650 of the bi-directional signal interface of the present invention that uses a combination of active and passive RF components. This embodiment of the connecting means 650 is well suited for low frequency operation down to DC. The connecting means 650 includes a resistive divider 652 that splits the outgoing signal source into two paths that propagate through a first 654 and a second output 656. Impedance matching is less important at low frequencies and at DC. Therefore, in some embodiments, it is not essential for the resistive divider 652 to maintain an impedance match at all the ports.

The first output 654 is coupled to an input 658 of the first electronic amplifier 660. The second output 656 is coupled to an input 662 of the second electronic amplifier 664. The first and second electronic amplifiers 660, 664 are designed to provide isolation. These amplifiers are designed to have gain in the forward direction (i.e. input-to-output) and substantial loss in the reverse direction (i.e. output-to-input).

The first and second outputs 654, 656 of the resistive divider 652 are always in phase. Therefore, to configure the connecting means 650 for an in-phase drive, the first and second electronic amplifiers 660, 664 are designed to have the same gain and gain polarity. The particular gain of these amplifiers is chosen to provide sufficient output signal power and to achieve effective modulation.

To configure the connecting means 650 for a complementary signal drive with signals that are 180 degrees out-of-phase, the first and second electronic amplifiers 660, 664 are designed to have the same gain, but opposite gain polarity. Techniques to provide such gains and gain polarities are well known in the art.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. A signal interface comprising:
a) a balanced dual-drive device having a first and a second input port and an output port, the first input port being coupled to an outgoing signal source that generates an output signal and an incoming signal source that generates an incoming signal, the second input port being coupled to the outgoing signal source; and
b) a means for isolating the input signal from the second input,
wherein the dual-drive device passes the incoming signal to the output port while isolating the outgoing signal from the incoming signal.

2. A signal interface comprising:
a) an optical source that generates an optical signal at an output;
b) an incoming electrical signal source that generates an incoming electrical signal at an output;
c) an outgoing electrical signal source that generates an outgoing electrical signal at an output;
d) a splitter having an input that is electrical coupled to the output of the outgoing electrical signal source, the splitter splitting the outgoing electrical signal into a first portion of the outgoing electrical signal at a first output and a second portion of the outgoing electrical signal at a second output; and
e) an electro-optic modulator having an optical input that is coupled to the output of the optical source, a first electrical port that is coupled to the first output of the splitter, a second electrical port that is coupled to the second output of the splitter, and a third electrical port that is coupled to the incoming electrical signal source, the electro-optic modulator modulating the incoming electrical signal while isolating the outgoing electrical signal from the incoming electrical signal.

3. The signal interface of claim 2 wherein the electro-optic modulator is selected from the group comprising an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic inorganic modulator, and an electro-optic organic modulator.

4. The signal interface of claim 2 wherein the electro-optic modulator comprises a first and a second modulation electrode that velocity matches the incoming electrical signal to an optical field of the optical signal.

5. The signal interface of claim 2 wherein the electro-optic modulator comprises a balanced modulator wherein a first and a second modulation electrode have approximately the same length.

6. The signal interface of claim 2 wherein the electro-optic modulator comprises an unbalanced modulator wherein a first and a second modulation electrode have different lengths.

7. The signal interface of claim 2 wherein the optical signal is selected from the group comprising a continuous wave optical beam, a pulsed optical beam, a sinusoidal optical beam, and a frequency swept sinusoidal optical beam.

8. The signal interface of claim 2 wherein an amplitude of the first portion of the outgoing electrical signal and an amplitude of the second portion of the outgoing electrical signal are approximately equal.

9. The signal interface of claim 2 wherein the second portion of the outgoing electrical signal is not equal to the first portion of the outgoing electrical signal.

10. The signal interface of claim 2 further comprising terminating a fourth electrical port of the electro-optic modulator with a characteristic impedance of a modulation electrode coupled to the fourth electrical port.

11. A method of interfacing an outgoing electrical signal with an incoming electrical signal, the method comprising:

a) receiving an optical signal at an optical input of dual-drive electro-optic modulator;
b) receiving a first portion of an outgoing electrical signal at a first port of the dual-drive electro-optic modulator;
c) receiving a second portion of the outgoing electrical signal at a second port of the dual-drive electro-optic modulator;
d) receiving an incoming electrical signal at a third electrical port of the dual-drive electro-optic modulator;
e) modulating the incoming electrical signal on the optical signal while isolating the outgoing electrical signal from the incoming electrical signal with the dual-drive electro-optic modulator; and
f) detecting a modulated incoming electrical signal at an output port of the electro-optic modulator.

12. The method of claim 11 wherein an amplitude of the first portion of the outgoing electrical signal is equal to an amplitude of the second portion of the outgoing RF electrical signal.

13. The method of claim 11 further comprising velocity matching RF fields of the incoming electrical signal to the optical field of the optical signal.

14. The method of claim 11 wherein the optical signal is selected from the group comprising a continuous wave optical beam, a pulsed optical beam, a sinusoidal optical beam, and a frequency swept sinusoidal optical beam.

15. The method of claim 11 further comprising terminating a fourth electrode of the electro-optic modulator with a characteristic impedance.

16. The signal interface of claim 1 wherein the means for isolating the input signal from the second input comprises a unidirectional device coupled between the first and second input port of the dual-drive device.

17. The signal interface of claim 2 wherein the second and third ports of the electro-optic modulator are electrically connected.

18. The method of claim 11 wherein the second and third ports of the electro-optic modulator are electrically connected.

* * * * *